Sept. 18, 1928.  V. JERECZEK  1,684,918

CHAIN TRACK FOR MOTOR VEHICLES

Filed Feb. 25, 1927

Inventor:
Viktor Jereczek
by D. Singer
Attorney.

Patented Sept. 18, 1928.

1,684,918

UNITED STATES PATENT OFFICE.

VIKTOR JERECZEK, OF WEISSENSEE, NEAR BERLIN, GERMANY, ASSIGNOR TO STOCK MOTORPFLUG AKTIENGESELLSCHAFT, OF BERLIN, GERMANY, A CORPORATION OF GERMANY.

CHAIN TRACK FOR MOTOR VEHICLES.

Application filed February 25, 1927, Serial No. 171,023, and in Germany December 17, 1925.

My invention concerns a chain track for motor vehicles, and relates more especially to a chain track of that kind in which the chain links can adjust themselves relatively to one another in a transverse plane. The object of the present invention is to effect improvements in the construction of the chain track whereby a relative adjustment of the chain links in a transverse plane with link pins which lie transversely of the chain is rendered possible, an economy in the construction of the chain track is effected and the durability thereof greatly increased.

The subject of the invention is illustrated in one embodiment by way of example in the accompanying drawing.

Figure 1:
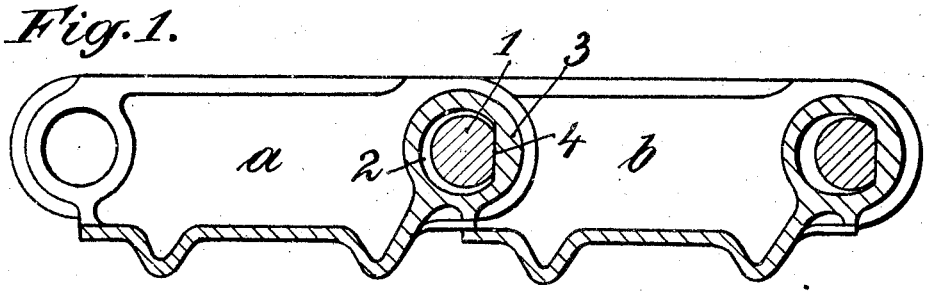
Fig. 1 is a longitudinal section through two chain links.
Figure 2:
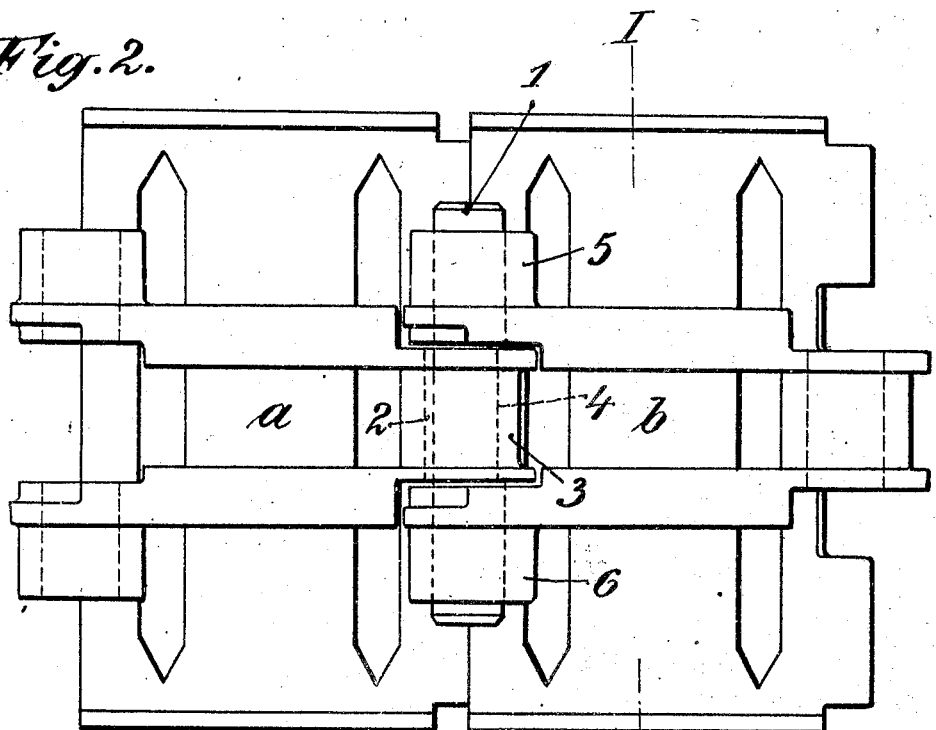
Fig. 2 is a plan.
Figure 3:
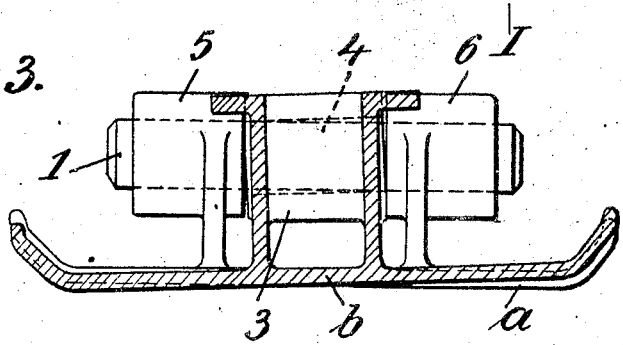
Fig. 3 is a cross section on line I—I of Fig. 2.

The two chain links $a$ and $b$ are connected together by the pin 1. The bore 2 of the pin sleeve 3 provided on chain link $a$ is wider than the diameter of the pin 1. Inside this sleeve the pin 1 is flattened on one side and the surface 4 thus formed lies against the corresponding surface of the sleeve bore 2. Both pin sleeves 5 and 6 disposed on the chain link $b$ engage closely around the circular outer ends of the pin so that only around the ends of the pin 1 situated in the sleeves 5 and 6 can a rotary motion of the two chain links $a$ and $b$ about the pin occur. If the two chain links $a$ and $b$ tend to execute a relative tilting movement, the pin remains fast inside the sleeves 5 and 6, and the tilting movement occurs inside the bore 2 of sleeve 3, because the surface 4 can adjust itself at a suitable inclination upon the plane surface of the bore 2, as is evident from Fig. 3. A rotary movement of the chain links about the pin upon the part of the pin limited by the surface 4 cannot occur.

I claim:

Chain track for motor vehicles, comprising in combination, chain links having pin holes, pins arranged in said holes and connecting said links, one of said pin holes of each of said links being wider in diameter than the pin, and each pin having a flat surface, and a corresponding flat surface provided in said hole, said two surfaces being adapted to prevent rotary movement of said pin within said hole, the other of said holes of each link having a diameter adapted to allow only a rotary movement of two adjoining chain links.

In testimony whereof I have affixed my signature.

VIKTOR JERECZEK.